United States Patent [19]
Grinbergs

[11] Patent Number: 5,855,320
[45] Date of Patent: Jan. 5, 1999

[54] COMBINED FURNACE AND HEAT RECOVERY SYSTEM

[75] Inventor: Peter Karl Grinbergs, Dorchester, Canada

[73] Assignee: Nutech Energy Systems Inc., London, Canada

[21] Appl. No.: 837,391

[22] Filed: Apr. 17, 1997

[51] Int. Cl.[6] ....................................................... F24F 7/00
[52] U.S. Cl. .................................. 237/46; 237/48; 237/50
[58] Field of Search .................................. 237/46, 48, 47, 237/49, 50, 52, 53

[56] References Cited

U.S. PATENT DOCUMENTS

| | | |
|---|---|---|
| 4,429,735 | 2/1984 | Nomaguchi et al. . |
| 4,727,931 | 3/1988 | Berner . |
| 4,844,020 | 7/1989 | Bruhn . |
| 5,117,563 | 6/1992 | Castonguay . |
| 5,179,998 | 1/1993 | Des Champs ................................. 165/1 |
| 5,220,955 | 6/1993 | Stokes . |
| 5,497,823 | 3/1996 | Davis . |
| 5,542,469 | 8/1996 | Kim . |

*Primary Examiner*—Henry A. Bennett
*Assistant Examiner*—Derek S. Boles

[57] ABSTRACT

The present invention relates to a combined furnace and air recovery system. The system is comprised of a furnace housing having an inlet opening for connection to a cold air return duct and an outlet opening connected to a heating duct. A negative pressure compartment is located within the housing and is in communication with the inlet opening. A positive pressure compartment is also located within the housing and is in communication with the outlet opening. A fan is provided, communicating between the negative pressure compartment and the positive pressure compartment. a heating unit is located within the positive pressure compartment. An air-to-air heat exchange unit is provided having first and second air flow paths, wherein the first air flow path connects an exterior inlet duct to the negative pressure chamber to provide a supply of fresh air to the negative pressure chamber and the second air flow path connects the positive pressure chamber to an exterior outlet duct to provide for exhausting stale air from said positive pressure chamber.

5 Claims, 3 Drawing Sheets

COMBINED FURNACE AND HEAT RECOVERY SYSTEM

The present invention relates to a combination furnace and air-to-air heat exchange unit. Such a unit can be called a combined heat recovery/furnace. It should be understood that the term furnace is defined as any unit that adds heat energy to a forced air system. The term air handler can be used interchangeably with the term furnace.

With the advent of totally sealed homes, it has become necessary to exchange a percentage of stale warm air within such a sealed home with cool fresh air from outside the home. In doing so the efficiency of the heating system within the sealed home is reduced. One method of recovering that efficiency is to transfer the heat energy of the exhausted stale air into the incoming cooler fresh air. This is accomplished by using an air-to-air heat exchange unit. In the past, such units have been separate from the furnace system itself. The air-to-air exchange unit has had to employ two fan systems, one to force the warm stale air through the exchange unit to the outdoors, and one to draw in the cool fresh air through the exchange unit.

The present invention combines the two units so that the overall efficiency of the system is improved and the use of only one fan, the fan that was formerly only used to operate the furnace, can now be used to not only operate the furnace but drive both the exhaust air and the incoming air through the air-to-air heat exchange unit.

In addition to increasing the efficiency of the overall system by using only one fan, the combined system enjoys a further efficiency improvement because of the temperatures available to the unit. This will be shown hereinbelow.

In accordance with one aspect of the present invention, there is provided a combined furnace and air recovery system for use in a building comprising: a furnace housing having an inlet opening for connection to a cold air return duct and an outlet opening connected to a heating duct; a negative pressure compartment located within said housing and in communication with said inlet opening; a positive pressure compartment located within said housing and in communication with said outlet opening; a fan means communicating between said negative pressure compartment and said positive pressure compartment; a heating means located within said positive pressure compartment; and an air-to-air heat exchange unit having first and second air flow paths; wherein said first air flow path connects an exterior inlet duct to said negative pressure chamber to provide a supply of fresh air from outside the building to said negative pressure chamber and said second air flow path connects said positive pressure chamber to an exterior outlet duct to provide for exhausting stale air outside the building from said positive pressure chamber.

The present invention will be described in detail hereinbelow with the aid of the accompanying drawings, in which.

Figure 1:
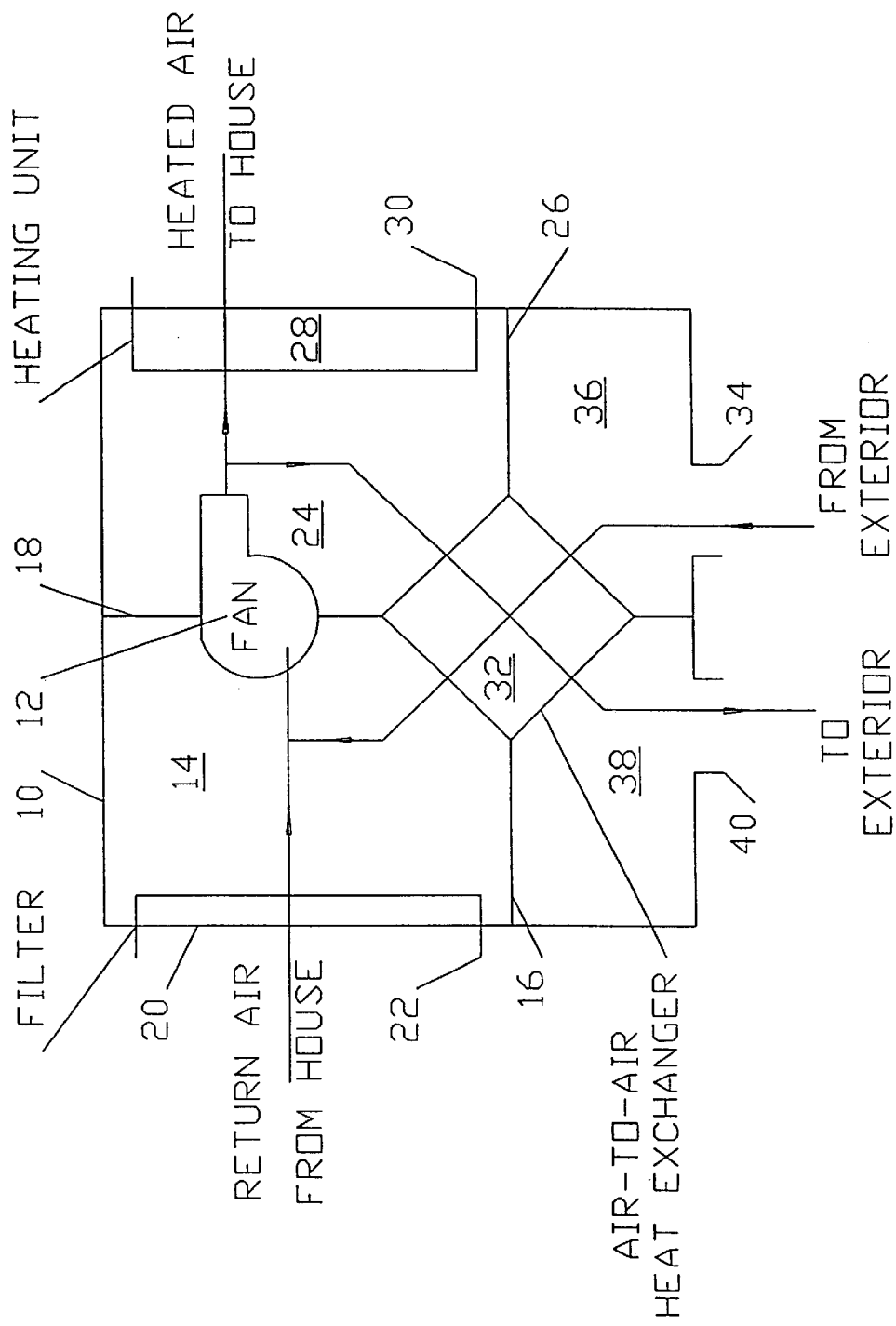
FIG. 1 is a schematic diagram of the present invention.

The present invention will be now described in detail with reference to FIGS. 1 and 2. FIG. 1 is a schematic diagram of a combination furnace system and an air-to-air exchange unit. FIG. 1 shows a furnace housing 10 in which there is located a fan 12. Negative air pressure chamber 14 is provided within the furnace housing 10 and is defined by interior walls 16 and 18. Air is drawn through a filter element 20 into negative air pressure chamber 14 by fan 12. The air comes from the cold air return duct 22. The fan 12 forces the air into a positive pressure chamber 24 located within the furnace housing 10. Positive air pressure chamber 24 is defined by interior walls 18 and 26. A heating unit 28 is located within positive air pressure chamber 24 and heats the air exiting the chamber into hot air duct 30. Heating air unit 28 can be any conventional heating element, for example, a hot water to air heat exchanger. The hot water can be generated by a boiler not shown. The heating air unit 28 could also be an electrical heating unit or a heat pump unit.

An air-to-air heat exchanger 32 is located within the furnace housing 10. One example of heat exchange unit 32 is described in detail in U.S. Pat. No. 4,554,719 which issued on Nov. 26, 1985. U.S. patent application Ser. No. 08/798,341, which was filed on Feb. 10, 1997, describes another such unit. Cool outside air is drawn from a duct 34, into a negative air pressure chamber 36 and through the air-to-air heat exchange unit 32 into negative air pressure chamber 14 by the action of fan 12. A portion of the warm air in positive air pressure chamber 24 is exhausted through the air-to-air exchange unit 32 into positive air pressure chamber 38 and out to the exterior of the building via exhaust duct 40.

The warm air exhausting through air-to-air heat exchange unit 32 warms the cool air being drawn into the building via the duct 34.

This combination of a heating furnace unit and an air-to-air heat exchange unit is more efficient than two separate units. For one reason, the combination unit makes use of a single fan unit to drive both the air through the furnace and also through the air-to-air exchange unit.

Another reason why the efficiency of the combined unit is greater than that of a separate furnace and air-to-air heat exchange unit is the relative temperatures of operation. This improvement in efficiency can be shown as follows:

Apparent Heat Recovery Effectiveness $E=\{Ms(X_2-X_1)\}/\{Mmin(X_3-X_1)\}$

Where $Ms$=Mass flow of the supply air $Mmin$=Mass flow of the lower of the supply or exhaust air flows $X_1$=outdoor air temperature $X_2$=supply air temperature $X_3$=indoor air temperature $X_4$=from air-to-air heat exchange unit to outside temperature Supply air=air from the heat exchanger to indoors Exhaust air=air from indoors to the heat exchanger.

$X_4=X_3-X_2$

Assume the following conditions for both the situations where there is a combined system and two separate systems. Outdoor air temperature is 0° C., indoor air temperature is 22° C. and the temperature of the air after the air handler heating coil is 35° C. The air flow rate through the air handler is 500 l/s and the air exchange rate is 50 l/s. Also assume a heat exchange core with a fixed apparent heat recovery efficiency of 60%.

Assume that in the heat exchanger the flow $Ms=Mmin$; then $E=(X_2-X_1)/(X_3-X_1)$ therefore $X_2=E\times(X_3-X_1)-X_1$ also with a sensible energy balance, $X_4=X_3-X_2$.

Figure 2:
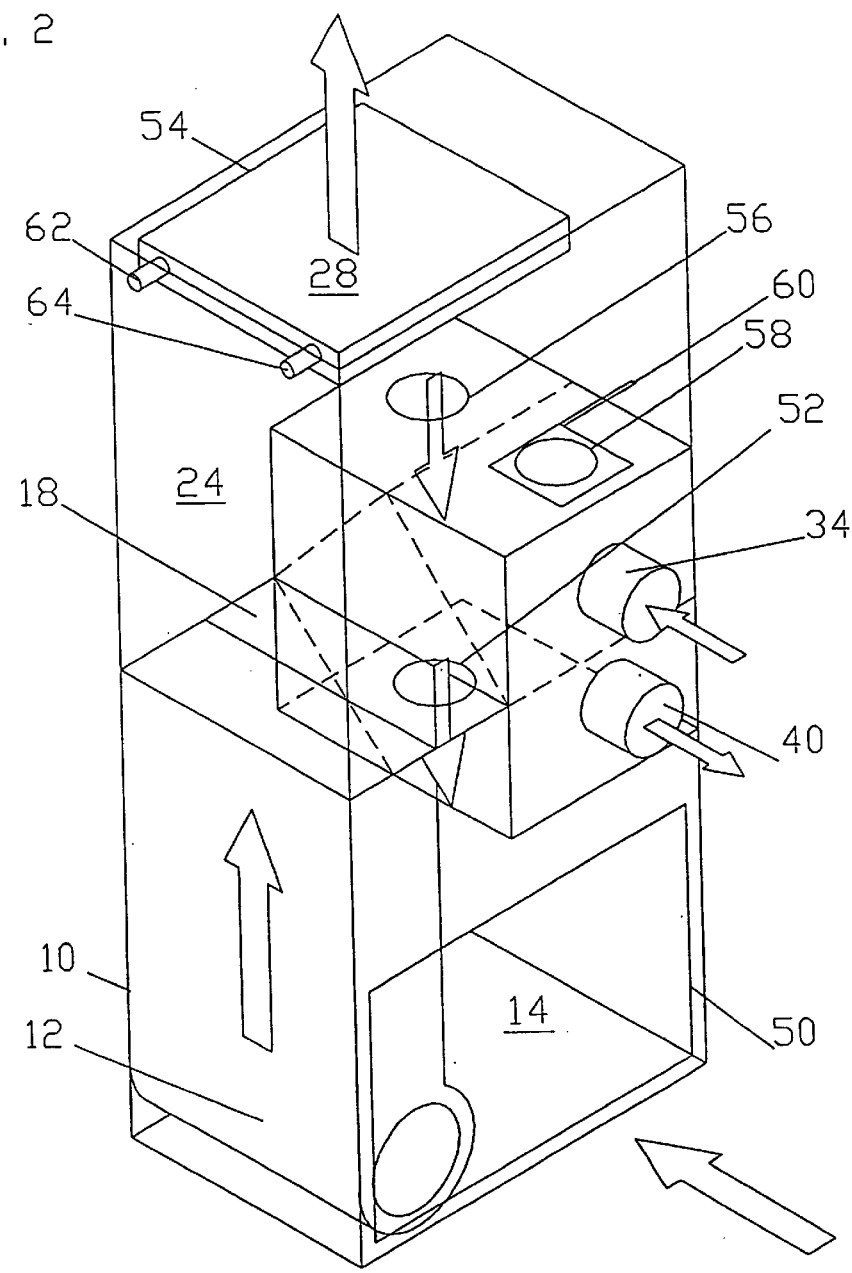
FIG. 2 is a perspective diagram of a particular embodiment of the present invention.

For the present invention as shown in FIG. 2., $X_2=0.6\times(22-0)-0=13.2°$ C.

and $X_4=22-13.2=8.8°$ C.

Figure 3:
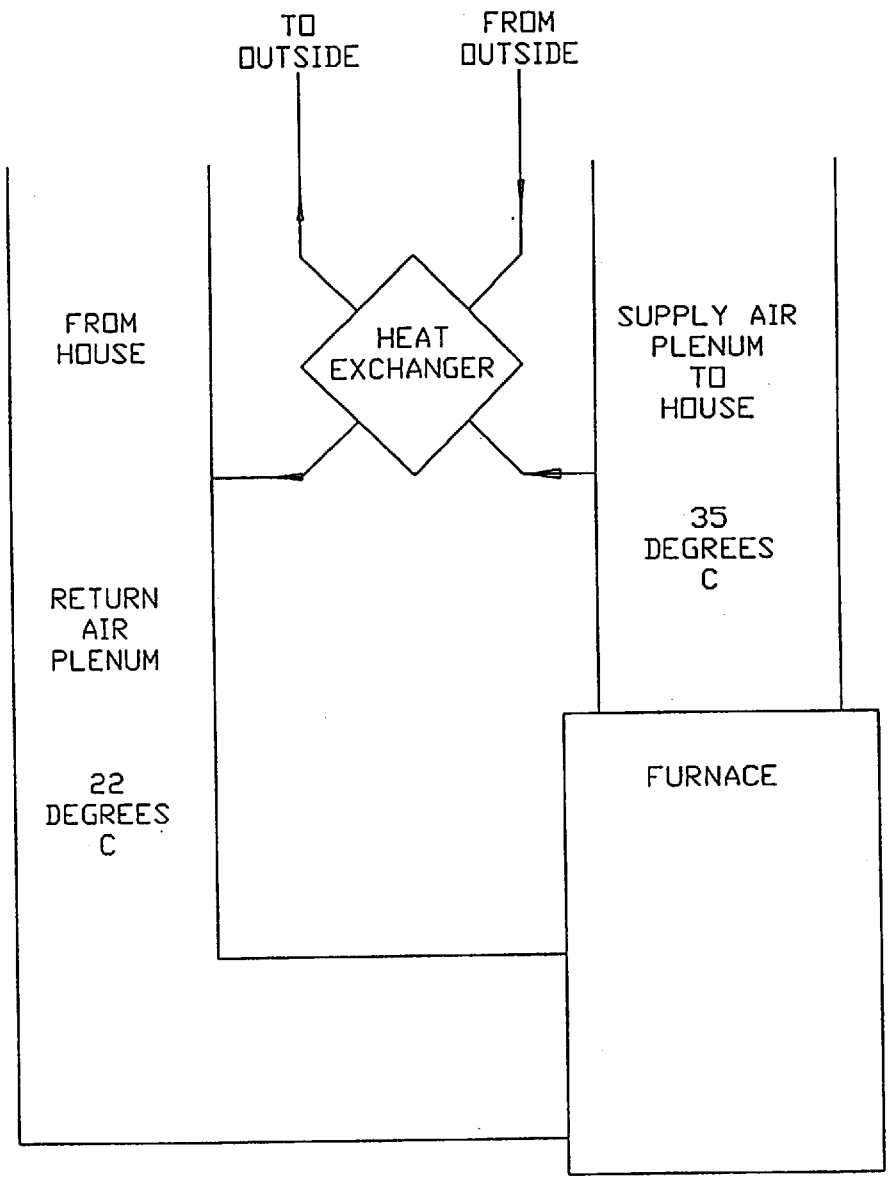
FIG. 3 is a schematic diagram of a prior art system used to show the relative effective efficiencies of the prior art system and the combined system of the present invention.

For a system that has a separate heat exchange unit and furnace as shown in FIG. 3, $X_2=0.6\times(35-0)-0=21°$ C.

and $X_4=35-21=14°$ C.

Both systems have heat exchangers that are 60% effective and indoor temperatures of 22° C. However, because the separate system uses the air heated by the air handler or furnace, which is 35° C., warmer air is exhausted to the outside.

The actual system effectiveness based on the 22° C. indoor air can now be calculated for the separate system based on the temperature of air from the heat exchanger to the outside, $X_4$ Using an energy balance, $X_2=X_3-X_4=22-14=8°$ C.

Then the Effectiveness $E=(8-0)/(22-0)=0.364$ or 36%.

This compares to the effectiveness of the present invention which, as a system, maintains the 60% effectiveness of the heat exchanger.

It is desirous that about 10% of the air within the heating system is exchanged at all times with fresh outside air that has been heated by the heat exchanger 32 with stale warm air that is being exhausted from the building. This ratio can be arranged by arranging the size of the openings connected to the cold air return duct and the hot air duct and the size of the openings of the air-to-air heat exchange unit 32.

FIG. 2 shows an actual configuration of the present invention. In order to show the interior configuration of the combination furnace and air-to-air heat exchange unit, the exterior walls of the furnace housing 10 have been shown as if they are transparent.

Fan 12 draws air into the furnace 10, into negative pressure chamber 14 through inlet 50 that would be connected to the cold air return of the building. An air filter (not shown) could be located directly inside negative pressure chamber 14 across inlet 50 to filter air returning from the building to the furnace 10. Air-to-air heat exchanger 32 is located within the furnace housing 10. The negative air pressure in chamber 14, draws air from the exterior of the building, through duct 34 and through the air-to-air exchanger 32. Aperture 52 in the air-to-air exchanger 32, allows the air to enter chamber 14 from the exterior of the building.

Fan 12 creates a positive air pressure in chamber 24. Chamber 24 is separated from chamber 14 by an internal wall 18. The positive air pressure in chamber 24 forces air through the heating element 28 and out of the furnace housing 10 via aperture 54.

The positive air pressure in chamber 24 also forces air through aperture 56 in the air-to-air exchanger 32 to exit via duct 40, to the exterior of the building.

The warm stale air traveling through the air-to-air heat exchanger 32 from aperture 56 to duct 40 warms the fresh air being pulled into the system from duct 34 through the air-to-air exchanger 32 and out aperture 52.

Since a single fan 12 is used to move all air flow through the combined system, the size of the apertures 50 and 54 of the furnace housing 10 and the size of the apertures 52 and 56 in the air-to-air heat exchanger 32 control the ratio of the amount of air that travels through the furnace housing 10 and the amount of air exhausted from and fresh air introduced into the furnace housing 10 via the air-to-air heat exchanger.

If the air exiting the system via the air-to-air exchanger has a very high moisture content, and if the outside temperature is very low, there can be so much energy transferred into the cold incoming air that the temperature of the outgoing air is lowered to the point where moisture freezes in the air-to-air exchanger 32. If this happens, a damper 60 can be opened and warm air from the positive air pressure chamber 24 will enter the air-to-air exchanger 32 via aperture 58, to warm it and melt the frozen moisture. This damper arrangement can be either automatic or manual. If automatic, air flow sensors (not shown) would determine that passages connecting aperture 56 and duct 40 were blocked with ice and open the damper 60.

The heating element 28 can be of any conventional type. For example heating element 28 could be a hot water to air exchanger. In this case hot water would flow into input pipe 62 from a hot water source (not shown) and flow out of output pipe 64, back to the source of hot water.

I claim:

1. A combined furnace and air recovery system comprising:

a furnace housing having an inlet opening for connection to a cold air return duct and an outlet opening connected to a heating duct;

a negative pressure compartment located within said housing and in communication with said inlet opening for receiving stall air from said inlet opening;

a positive pressure compartment located within said housing and in communication with said outlet opening;

a single fan unit communicating between said negative pressure compartment and said positive pressure compartment thereby creating negative pressure in said negative pressure compartment and positive pressure in said positive pressure compartment;

a heating means located within said positive pressure compartment; and an air-to-air heat exchange unit having first and second air flow paths;

wherein said first air flow path connects an exterior inlet duct to said negative pressure chamber for mixing with said stall air from said inlet duct to provide a supply of fresh air to said negative pressure chamber and said second air flow path connects said positive pressure chamber to an exterior outlet duct to provide for exhausting stale air from said positive pressure chamber.

2. The combined system according to claim 1, wherein said first air flow path is comprised of an inlet opening in said air-to-air heat exchange unit, a first heat exchange path within said air-to-air heat exchange unit and a fresh air outlet opening from said air-to-air heat exchange unit to said negative pressure chamber.

3. The combined system according to claim 2, wherein said second air flow path is comprised of a stale air inlet opening from said positive pressure chamber into said air-to-air heat exchange unit, a second heat exchange path within said air-to-air heat exchange unit and a stale air outlet opening from said air-to-air heat exchange unit.

4. The combined system according to claim 3, wherein the area of said stale air inlet opening and the area of said inlet opening of said furnace housing is such that the air flow through said air-to-air heat exchange unit is 10% of the air flow through said furnace housing from said inlet opening to said outlet opening.

5. The combined system according to claim 4, wherein said air-to-air heat exchange unit has a frost removing aperture connected to said positive pressure chamber, said aperture being covered by a damper control flap that is adjustable from a fully closed position to a fully open position.

* * * * *

UNITED STATES PATENT AND TRADEMARK OFFICE
CERTIFICATE OF CORRECTION

PATENT NO. : 5,855,320
DATED : January 5, 1999
INVENTOR(S) : GRINBERGS, Peter Karl It is certified that error appears in the above-indentified patent and that said Letters Patent is hereby corrected as shown below:

Claim 1, Col. 4, lines 20 and 34 (each occurrence) change "stall" to --stale--.

Signed and Sealed this

Twenty-fourth Day of October, 2000

Attest:

Q. TODD DICKINSON

*Attesting Officer*　　*Director of Patents and Trademarks*